Sept. 28, 1937.  M. E. COLLINS  2,094,095

FILM TAKE-UP DRIVE

Filed Nov. 11, 1933

INVENTOR
MILFORD EDWIN COLLINS
BY H. S. Grover
ATTORNEY

Patented Sept. 28, 1937

2,094,095

UNITED STATES PATENT OFFICE 2,094,095

FILM TAKE-UP DRIVE

Milford Edwin Collins, Collingswood, N. J., assignor to Radio Corporation of America, a corporation of Delaware Application November 11, 1933, Serial No. 697,568

6 Claims. (Cl. 192—58)

This invention relates to power transmitting devices, and more particularly to means for rendering uniform the tension of winding reels for handling motion picture film or the like.

Heretofore various types of mechanisms have been used to drive the film take-up reels of motion picture, sound recording and sound reproducing apparatus. Practically all of these devices have been of the friction drive type depending upon the slip of a friction clutch or upon the slip of a belt in order to secure the variation in speed necessary with increasing diameter of the take-up reel. Such devices have had several disadvantages, one disadvantage being that the torque applied was uniform and therefore the tension on the film decreases as the radius of the roll of film on the reel increases. Another disadvantage has been that the drive was more or less irregular and jerky, therefore requiring some type of mechanism such as a hold-back sprocket to be inserted in co-operative relation with the film between the take-up reel and sound recorder or reproducer to prevent the distortional effect of such jerks at the sound recording or reproducing point.

In accordance with my invention, the take-up reel is associated with a power transmitting device which is uniform in operation and applies a torque increasing as the reel diameter increases, thus producing a uniform tension to the film. It will be apparent that the invention is not limited to film take-up reels but is applicable to winding reels generally.

One object of the invention is to provide a winding reel drive which is free from irregularities of motion.

Another object of the invention is to provide a winding reel drive which will give a uniform tension on the material wound at all times regardless of variations in the diameter of the roll.

Another object of the invention is to provide a winding reel drive in which the tension applied to the material wound may be readily adjusted.

Another object of the invention is to provide a take-up drive wherein the tension applied to the film or material wound is independent of the diameter of the reel.

Another object of the invention is to provide a winding reel drive which is free from jerks or mechanical oscillations.

Figure 1:
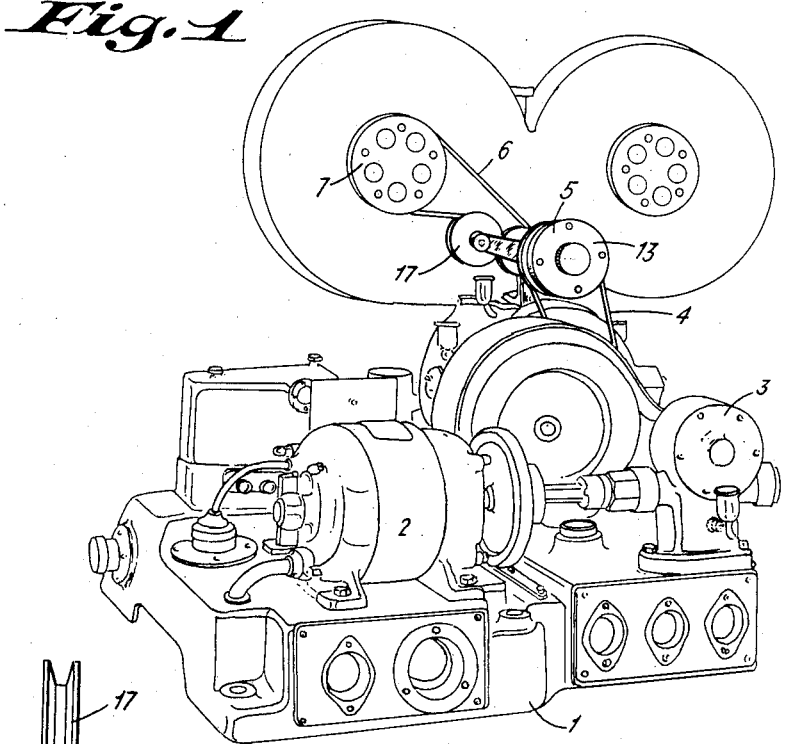
Figure 1 shows my take-up drive as applied to the film reel of a sound-on-film recorder of the variable area type.

In Fig. 1, 1 indicates the base of the recorder mechanism upon which is mounted an appropriate constant speed motor 2 which serves to drive the entire apparatus through the gear box 3. From an appropriate pulley located on the recorder mechanism, the belt 4 is driven at a speed somewhat higher than that necessary to drive the take-up reel with the film just started to be wound on a hub of the smallest diameter used in the apparatus. This belt 4 drives the power transmitting mechanism indicated generally at 5 in Fig. 1 which in turn drives the belt 6 and this drives the pulley 7 on the shaft of the take-up reel.

Figure 2:
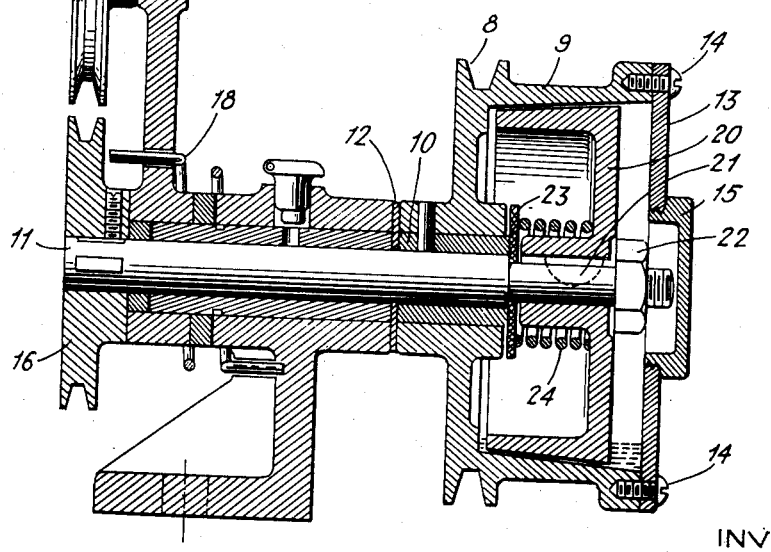
Figure 2 is a detailed longitudinal section through the improved take-up drive device.

Referring now to Fig. 2: The belt 4 runs in the groove 8 of the casing 9. This casing is provided with a bushing 10 running freely on the shaft 11 and is provided also with a thrust washer 12. The front of the casing is covered by a member 13 secured thereto by screws 14 so as to be fluid-tight and this cover 13 is provided with a central aperture closed by a screw plug 15 the purpose of which will hereinafter appear.

The belt 6 is driven by the pulley 16 which, as shown, is keyed upon the shaft 11 by which it is driven. A yieldable idler 17 is forced by the spring 18 into co-operative relation with the belt 6 to maintain it in proper frictional relation with the pulleys 7 and 16 at all times.

The casing 9 has a conically tapered inner surface as shown, and within the casing there is located the member 20 which has a correspondingly conically tapered outer surface spaced at a slight distance from the inner surface of the casing 9. The member 20 is slidably keyed to the shaft 11 as indicated at 21 and is retained on the shaft by the nut 22. A washer 23 bears against a shoulder on the shaft 11 and supports the spring 24 which forces the member 20 away from the washer 23 and firmly into contact with the nut 22.

It will be apparent that if the screw plug 15 is removed from the cover plate 13 a wrench may be inserted through the aperture and the nut 22 rotated, thus adjusting the position of the member 20 longitudinally of the shaft 11 and varying the distance between the tapered surfaces of the members 9 and 20.

A small quantity of oil is placed in the casing 9 and serves to provide a viscous coupling between the driving member which is the casing 9 and the driven member 20 which drives the shaft 11 and thereby the pulley 16 and the take-up reel.

It is a property of the friction drives of the prior art, above referred to, that the torque supplied is independent of the rate of slippage. In such a drive as I have described, however, the torque produced upon the member 20 by the driving member 9 varies with their difference in velocity, i. e., the greater their relative speeds the greater the torque, and this torque can be adjusted by choice of an oil of proper viscosity as well as by longitudinal adjustment of the member 20 on the shaft 11.

When the device is properly adjusted and is driven by the belt 4 as described above, the member 9 will be driven slightly faster than the member 20 at the highest speed at which the take-up reel rotates, i. e., when the film is just started on the smallest sized reel hub, the film being always fed at a uniform linear speed by the recording apparatus. As the size of the reel of film increases the radius thereof increases, and therefore the torque required to maintain a uniform longitudinal tension on the film increases with the radius. However, the rotational velocity of the reel and therefore of the pulley 7 decreases in the same ratio as the radius increases due to the constant velocity of the film. This causes an increased slip between the members 9 and 20 and, since the torque in this device increases as the slip, the torque applied to the pulley 7 will increase as the diameter of the reel of film increases and a uniform tension will therefore be applied to the film at all times.

It will be apparent that the continuous viscous yield of the oil will drive the pulley 16 without any sudden jumps or irregularities of motion and there will therefore be no tendency for the film to jerk as in the case of a friction drive.

If the machine is started with the take-up reel partly full of film and with some slack film between the reel and the mechanism, my drive mechanism will slip somewhat in overcoming the inertia of the film reel and will gradually take up the slack and then gradually increase the tension upon the film until the normal take-up tension is reached, and it will do this without any sudden jerks or other irregularities in motion common to the prior art devices.

It will be apparent that the use of my invention is not limited to sound film records but may be applied under a large variety where a material is to be subjected to a uniform winding tension.

Having thus described my invention, I claim:

1. A reel drive comprising a shaft, a conical member rotationally fixed to said shaft and adjustable therealong, a conical casing surrounding said member and freely rotatable on said shaft, means for driving said casing, a viscous fluid in said casing coupling it to said member, and means for adjusting said member comprising a nut on said shaft for forcing the member in one direction and a spring on said shaft forcing the member against the said nut.

2. A take-up drive for film reels comprising a shaft, a conical member rotationally fixed to said shaft and adjustable therealong, a conical casing surrounding said member and freely rotatable on said shaft, means for driving said casing, a viscous fluid in said casing coupling it to said member, and means for adjusting said member comprising a nut on said shaft for forcing the member in one direction and a spring on said shaft forcing the member against the said nut at a substantially uniform speed greater than the maximum speed of said shaft whereby the torque on said shaft increases as the speed thereof decreases.

3. Drive mechanism for film take-up reels comprising a shaft, means coupling said shaft to the take-up reel, a conical member rotationally fixed to said shaft and adjustable therealong, a conical casing surrounding said member and freely rotatable in relation to said shaft, a viscous fluid in said casing coupling it to said member, means for adjusting said member comprising a nut on said shaft for forcing the member in one direction and a spring on said shaft forcing the member against the said nut, and means for driving said casing at a substantially uniform speed.

4. A reel drive comprising a shaft, a member rotationally fixed to said shaft and adjustable therealong, a casing surrounding said member and freely rotatable on said shaft, means for driving said casing, a viscous fluid in said casing coupling it to said member, and means for adjusting said member comprising a nut on said shaft for forcing the member in one direction and a spring on said shaft forcing the member against the said nut.

5. A take-up drive for film reels comprising a shaft, a member rotationally fixed to said shaft and adjustable therealong, a casing surrounding said member and freely rotatable on said shaft, means for driving said casing, a viscous fluid in said casing coupling it to said member, and means for adjusting said member comprising a nut on said shaft for forcing the member in one direction and a spring on said shaft forcing the member against the said nut at a substantially uniform speed greater than the maximum speed of said shaft whereby the torque on said shaft increases as the speed thereof decreases.

6. Drive mechanism for film take-up reels comprising a shaft, means coupling said shaft to the take-up reel, a member rotationally fixed to said shaft and adjustable therealong, a casing surrounding said member and freely rotatable in relation to said shaft, a viscous fluid in said casing coupling it to said member, means for adjusting said member comprising a nut on said shaft for forcing the member in one direction and a spring on said shaft forcing the member against the said nut, and means for driving said casing at a substantially uniform speed.

MILFORD EDWIN COLLINS.